Figure 1:
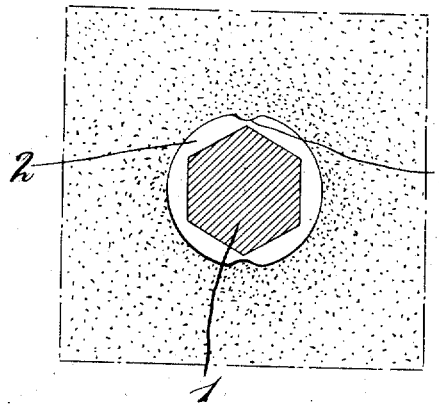

L. E. WHITON.
PROCESS OF FORMING BEARINGS.
APPLICATION FILED MAR. 22, 1912.

1,049,958.

Patented Jan. 7, 1913.
2 SHEETS—SHEET 1.

Witnesses:

Inventor
L. E. Whiton
By his Attorneys

L. E. WHITON.
PROCESS OF FORMING BEARINGS.
APPLICATION FILED MAR. 22, 1912.

1,049,958.

Patented Jan. 7, 1913.
2 SHEETS—SHEET 2.

UNITED STATES PATENT OFFICE.

LUCIUS E. WHITON, OF NEW LONDON, CONNECTICUT.

PROCESS OF FORMING BEARINGS.

1,049,958.   Specification of Letters Patent.   Patented Jan. 7, 1913.

Application filed March 22, 1912. Serial No. 685,526.

*To all whom it may concern:*

Be it known that I, LUCIUS E. WHITON, a citizen of the United States, residing at New London, New London county, Connecticut, have invented certain new and useful Improvements in Processes of Forming Bearings, of which the following is a full, clear, and exact description.

This invention relates to a process of forming bearings for machine elements, and is primarily designed to provide means which are particularly efficacious when bearing surfaces of irregular contour are to be formed.

When machine parts are mounted upon a round shaft, or analogous element, it is necessary to bore the gear element to the required cross section of the shaft, spline the shaft and fit a key to the gear element and to the splined shaft. These operations require considerable time and skill and are correspondingly expensive. When the gear element is to be fitted to such a shaft for sliding movement thereon, a groove of the requisite length has to be machined in the shaft, and a key fitted to the gear element and to this groove. These operations may be obviated and increased driving power and bearing surface secured, both for power transmission and sliding movement, by the use of shafting of irregular cross sectional contours, such as polygonal and oval, but the extreme nicety of calculation and great time required to machine the bearing parts to fit such shafting makes this operation too costly to permit its commercial utilization. My invention makes it commercially practicable to use bearings and shafting of such irregular contours for this purpose and is designed to afford a quick, comparatively inexpensive and practical means of forming bearing surfaces on machine elements to correspond and coöperate with such irregularly contoured shafting, thereby rendering their use commercially practicable to a high degree and securing greatly increased driving power and wearing surface.

In its broad aspect, the process consists in first making a thin chilled casting, the internal contour of which corresponds to that of the shaft or analogous element upon which the machine element is to be mounted; removing the chilled casting from the chill; cleaning and finishing the interior thereof if necessary and fitting it to its shafting; subsequently securing the parts of the casting together by suitable means; and then using this casting as a core about which the desired machine or gear element is cast and to which it welds in the process of casting.

In the drawings I have illustrated various embodiments of structure and steps in the process of forming these bearings.

Figure 2:
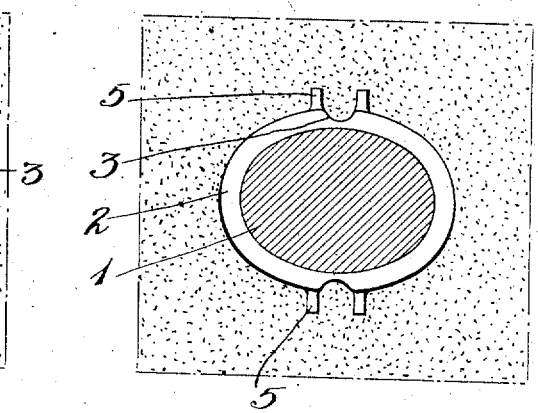
Figure 3:
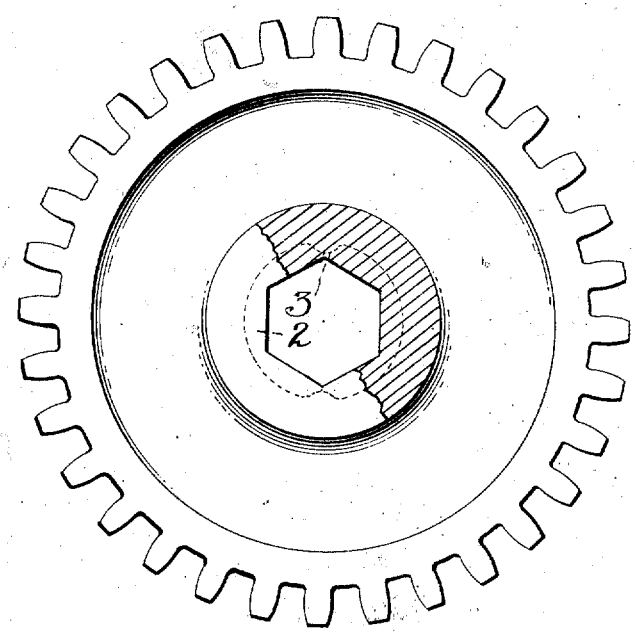
Figure 4:
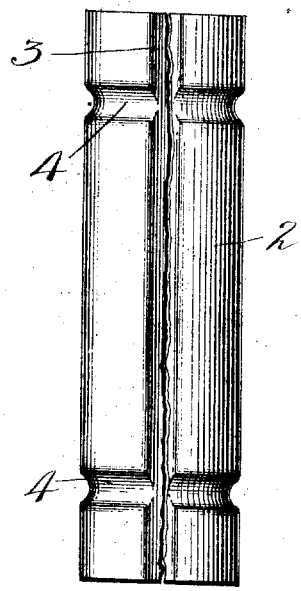
Figure 5:
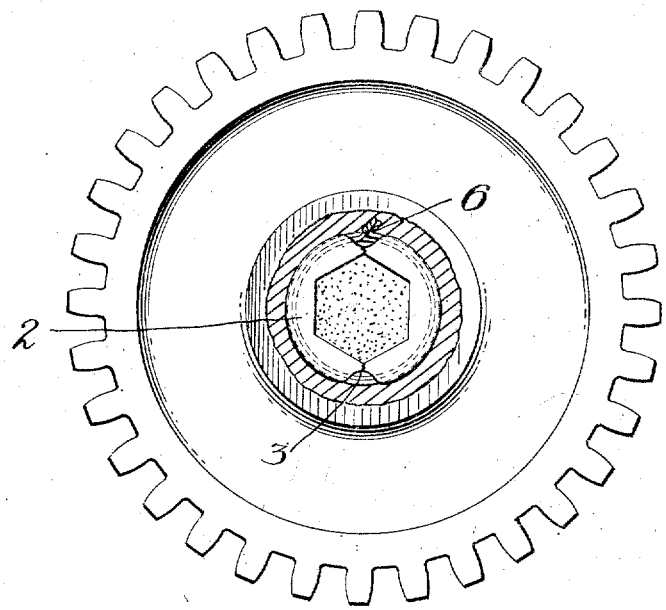
Figure 6:
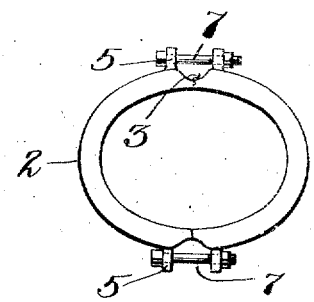

In these drawings, Figure 1 is a sectional view illustrating the formation of a chilled casting of hexagonal internal contour. Fig. 2 is a similar view showing the process as applied to oval shafting, the casting being otherwise somewhat modified. Fig. 3 is a view showing a composite gear element with a hexagonal bearing surface formed in accordance with my process, the hub portion being shown in section. Fig. 4 is a plan view of a chilled casting such as shown in Fig. 1. Fig. 5 is a view in elevation, partly in section, illustrating one form of a composite gear element such as shown in Fig. 3 and as formed according to my process, the casting appearing separate and unwelded for purposes of illustration. Fig. 6 is a view in end elevation illustrating a modified form of assembling means for the chilled casting after being stripped from its core.

Referring to the drawings by numerals, 1 indicates a core whose cross-sectional contour corresponds to that of the shaft or other element upon which a machine element is to be fitted. In Fig. 1 I have shown this core as being hexagonal in shape, and in Fig. 2, as oval in shape, these cross-sectional contours, however, being only illustrative of the possibilities in variation of form. About this core I make a chilled casting 2 which forms the bearing or bushing for the machine element. It is, of course, understood that the core member 1 acts to extract the heat from the thin casting 2 and chill or harden the surface thereof. In making this casting, I may form therein a longitudinally extending groove 3, or I may form two grooves diametrically opposite each other and may also form a transverse groove or grooves 4. In some cases, it is desirable to form pairs of spaced lugs 5 at diametrically opposite points in the casting and, when the longitudinal grooves 3 are used in the same casting, the lugs of each pair are located on each side of the grooves. The grooves 3 formed in the casting are for the purpose of forming lines of weakness to thereby permit the casting to be broken along the lines of these grooves and stripped from the core, (see Figs. 4, 5 and 6). Instead of forming these longitudinal grooves in the casting, I may, after the chill has been cast, mill a groove or grooves longitudinally thereof and then break the chill along the line of this groove or grooves and separate it from the core. The separated casting, after removal from the core, is then cleaned and polished if necessary or desirable, and fitted to the shaft or other element upon which it is designed to be mounted. The sections of the separated casting are then bound together by wire 6, or, when the lugs 5 are cast thereon, by bolts or other fastening devices 7 connecting these lugs, and the assembled casting is then placed as a core in the center of the mold for the gear, pulley, bushing, sleeve, or other machine element, (see Fig. 5), and the latter then cast about it. The transverse grooves 4 hereinbefore referred to and lugs 5 act as abutments and assist in binding the casting or core to the body of the machine element, this core being welded securely into the element being cast thereabout, and the sections of the core itself being securely held together in proper alinement by the mass of metal surrounding the core and forming the machine element. In Fig. 3 I show in section the composite hub of a gear element so formed, the original relative position of the chilled casting core being indicated in dotted lines. When binding wire is used, it may be wound around in these grooves or may encircle the casting at other points. The lugs 5 and transverse grooves 4 may be used alternately or in combination, and are susceptible of a wide range of modification.

It will thus be seen that I have devised an expeditious and commercially practicable process by which machine elements may be provided with bearing surfaces of desired cross-sectional contour and by which a machine element may be molded or cast with a bearing surface of desired specific cross-section.

As I have hereinbefore stated, the process of my invention has been shown in connection with hexagonal and oval shafting or other analogous element. The process, however, is not restricted to these specific forms, but has a wide range of use within the scope of the invention and of the appended claims.

What I claim, therefore, and desire to secure by Letters Patent, is:

1. The process of forming bearing sleeves for machine elements which consists in making a thin chilled casting about a core of the desired cross-sectional contour, removing the casting therefrom and positioning it as a core, and casting thereabout a machine element.

2. The process of forming bearing sleeves for machine elements which consists in making a thin casting about a core of the cross-sectional contour of the bearing surface, breaking said casting on its core and removing it therefrom, assembling the separated parts and positioning said casting in a mold as a core, and casting thereabout and welding thereto the machine element desired.

3. The process of forming bearing sleeves for machine elements which consists in making a thin casting about a core of the desired cross-sectional contour, forming a weakening groove in said casting, breaking said casting along the line of weakness and removing it from its core, assembling said casting in a mold as a core, and casting thereabout the machine element desired.

4. The process of forming bearing sleeves for machine elements which consists in making a thin chilled casting about a core of the desired cross-sectional contour, forming a weakening groove or grooves longitudinally of the casting, breaking the casting along the lines of said groove or grooves and stripping it from its core, assembling and securing together the sections of the chilled casting, positioning it in a mold as a core and casting thereabout the machine element desired.

5. The process of forming non-circular bearing sleeves for machine elements which consists in making a thin chilled casting about a core of the desired cross-sectional contour, breaking the casting on said core and removing the casting therefrom, and positioning the assembled chilled casting in a mold as a core and casting thereabout, the machine element desired.

6. The process of forming non-circular bearings for machine elements which consists in making a thin chilled casting about a core of the desired cross-sectional contour, forming a weakening groove in said casting, breaking said casting along the lines of weakness and removing it from its core, assembling said casting in a mold as a core, and casting thereabout the machine element desired.

7. The step in the process of forming bearing sleeves for machine elements which consists in forming about a core of the desired cross-sectional contour a thin casting provided with an abutment surface projecting above the plane of the casting and adapted to bind the casting to a machine element cast thereabout.

8. The process of forming machine elements provided with bearing sleeves of definite cross-sectional contour which consists in making a thin chilled casting about a core of the desired cross-sectional contour, forming a weakening groove in the casting, breaking the casting along the line of said groove and removing the casting from its core, assembling and securing together the sections of the casting and positioning the casting in a mold as a core, and casting thereabout the machine element desired.

9. The process of forming bearing sleeves for machine elements, which consists in forming a thin casting about a core of the desired cross-sectional contour, breaking said casting on said core and removing it therefrom, fitting the assembled parts of the casting to their bearing part, then securing together said parts and positioning the assembled casting in a mold as a core and casting thereabout the desired machine element.

10. The process of forming bearing sleeves for machine elements, which consists in making a thin chilled casting about a core of the desired cross-sectional contour and forming said casting with complementary spaced abutments projecting upwardly from the plane of the casting, forming a weakening groove in said casting between said abutments, and breaking said casting along the line of said weakening grooves and removing it from its core, assembling said casting in a mold as a core with the abutments thereof connected to unite the parts of the casting, and casting thereabout the desired machine element.

11. The process of forming bearing sleeves for machine elements, which consists in making a thin chilled casting about a core of the desired cross-sectional contour and forming on said casting complementary spaced lugs projecting upwardly from the plane of the casting, forming a weakening groove in said casting between said lugs, breaking said casting along the line of said weakening grooves and removing it from its core, assembling said casting in a mold as a core with the lugs thereof rigidly connected to bind the parts of the casting together, and casting thereabout the desired machine element.

LUCIUS E. WHITON.

Witnesses:
 MERLE J. CHANDLER,
 LUTHER G. STEBBINS.

---

It is hereby certified that in Letters Patent No. 1,049,958, granted January 7, 1913, upon the application of Lucius E. Whiton, of New London, Connecticut, for an improvement in "Processes of Forming Bearings," an error appears in the printed specification requiring correction as follows: Page 2, line 106, for the word "bearings" read *bearing sleeves;* and that the said Letters Patent should be read with this correction therein that the same may conform to the record of the case in the Patent Office.

Signed and sealed this 28th day of January, A. D., 1913.

[SEAL.]

C. C. BILLINGS,
*Acting Commissioner of Patents.* core, assembling and securing together the sections of the casting and positioning the casting in a mold as a core, and casting thereabout the machine element desired.

9. The process of forming bearing sleeves for machine elements, which consists in forming a thin casting about a core of the desired cross-sectional contour, breaking said casting on said core and removing it therefrom, fitting the assembled parts of the casting to their bearing part, then securing together said parts and positioning the assembled casting in a mold as a core and casting thereabout the desired machine element.

10. The process of forming bearing sleeves for machine elements, which consists in making a thin chilled casting about a core of the desired cross-sectional contour and forming said casting with complementary spaced abutments projecting upwardly from the plane of the casting, forming a weakening groove in said casting between said abutments, and breaking said casting along the line of said weakening grooves and removing it from its core, assembling said casting in a mold as a core with the abutments thereof connected to unite the parts of the casting, and casting thereabout the desired machine element.

11. The process of forming bearing sleeves for machine elements, which consists in making a thin chilled casting about a core of the desired cross-sectional contour and forming on said casting complementary spaced lugs projecting upwardly from the plane of the casting, forming a weakening groove in said casting between said lugs, breaking said casting along the line of said weakening grooves and removing it from its core, assembling said casting in a mold as a core with the lugs thereof rigidly connected to bind the parts of the casting together, and casting thereabout the desired machine element.

LUCIUS E. WHITON.

Witnesses:
 MERLE J. CHANDLER,
 LUTHER G. STEBBINS.

---

It is hereby certified that in Letters Patent No. 1,049,958, granted January 7, 1913, upon the application of Lucius E. Whiton, of New London, Connecticut, for an improvement in "Processes of Forming Bearings," an error appears in the printed specification requiring correction as follows: Page 2, line 106, for the word "bearings" read *bearing sleeves;* and that the said Letters Patent should be read with this correction therein that the same may conform to the record of the case in the Patent Office.

Signed and sealed this 28th day of January, A. D., 1913.

[SEAL.]

C. C. BILLINGS,
*Acting Commissioner of Patents.*

Correction in Letters Patent No. 1,049,958.

It is hereby certified that in Letters Patent No. 1,049,958, granted January 7, 1913, upon the application of Lucius E. Whiton, of New London, Connecticut, for an improvement in "Processes of Forming Bearings," an error appears in the printed specification requiring correction as follows: Page 2, line 106, for the word "bearings" read *bearing sleeves;* and that the said Letters Patent should be read with this correction therein that the same may conform to the record of the case in the Patent Office.

Signed and sealed this 28th day of January, A. D., 1913.

[SEAL.]

C. C. BILLINGS,
*Acting Commissioner of Patents.*